US010506120B2

(12) United States Patent
Suzuki et al.

(10) Patent No.: US 10,506,120 B2
(45) Date of Patent: Dec. 10, 2019

(54) PRINT CONTROL APPARATUS, NON-TRANSITORY COMPUTER READABLE MEDIUM, AND PRINT SYSTEM HAVING ERASE PROCESSING INCLUDING DATA OVERWRITING

(71) Applicant: FUJI XEROX CO., LTD., Tokyo (JP)

(72) Inventors: Yuji Suzuki, Kanagawa (JP); Mamoru Mochizuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/797,554

(22) Filed: Oct. 30, 2017

(65) Prior Publication Data

US 2018/0270379 A1 Sep. 20, 2018

(30) Foreign Application Priority Data

Mar. 14, 2017 (JP) .................. 2017-048238

(51) Int. Cl.
*H04N 1/00* (2006.01)
*G06K 15/02* (2006.01)
*H04N 1/21* (2006.01)

(52) U.S. Cl.
CPC ..... *H04N 1/00875* (2013.01); *G06K 15/1886* (2013.01); *H04N 1/0096* (2013.01); *H04N 1/2166* (2013.01); *H04N 2201/0082* (2013.01); *H04N 2201/218* (2013.01)

(58) Field of Classification Search
CPC ............. H04N 1/00875; H04N 1/2166; H04N 1/0096; H04N 2201/218; H04N 2201/0082; H04N 2201/3295; G06K 15/1886; G06F 2212/7205; G06F 3/0652; G06F 3/1274
See application file for complete search history.

(56) References Cited

U.S. PATENT DOCUMENTS

2004/0012812 A1* 1/2004 Shimizu ................ G06F 3/1205
358/1.15
2004/0257613 A1* 12/2004 Okabe ................... G06F 3/1203
358/1.15
2008/0024835 A1* 1/2008 Harano .............. H04N 1/00278
358/474

(Continued)

FOREIGN PATENT DOCUMENTS

JP    2005-313567 A   11/2005
JP    2006-338400 A   12/2006
JP    2016-115343 A    6/2016

*Primary Examiner* — Kent Yip
(74) *Attorney, Agent, or Firm* — Oliff PLC

(57) ABSTRACT

A print control apparatus includes a memory, a print processing unit, and an erase processing unit. The memory stores one or more pieces of print data each representing print content and being subjected to a print process. The print processing unit performs the print process for a piece of print data stored in the memory, and generates a piece of post-process data that represents print content. The erase processing unit moves, to a trash or a deletion folder, a piece of data for which the print process has been performed among one or more pieces of data stored in the print processing unit, and performs an erase process for a storage area of the piece of data that has been moved, the erase process being a process of data overwriting and being performed in parallel with the print process that is performed for another piece of print data.

18 Claims, 9 Drawing Sheets

(56) References Cited

U.S. PATENT DOCUMENTS

2015/0363417 A1* 12/2015 Ozawa .............. G06F 17/30082
707/704
2016/0171241 A1 6/2016 Yun
2018/0059986 A1* 3/2018 Maesono ................ G06F 3/061

* cited by examiner

PRINT CONTROL APPARATUS, NON-TRANSITORY COMPUTER READABLE MEDIUM, AND PRINT SYSTEM HAVING ERASE PROCESSING INCLUDING DATA OVERWRITING

CROSS-REFERENCE TO RELATED APPLICATIONS

This application is based on and claims priority under 35 USC 119 from Japanese Patent Application No. 2017-048238 filed Mar. 14, 2017.

BACKGROUND

(i) Technical Field

The present invention relates to a print control apparatus, a non-transitory computer readable medium, and a print system.

(ii) Related Art

A print control apparatus that performs, for print data, a print process including image processing and rasterization processing for printing and inputs the print data to a printer is available. Such a print control apparatus is typically implemented as a controller of a printer or a print server.

Further, for an apparatus that processes, for example, images and text, a technique for erasing data that is not necessary anymore so as to make recovery of the data difficult has been proposed from the viewpoint of security.

SUMMARY

According to an aspect of the invention, there is provided a print control apparatus including a memory, a print processing unit, and an erase processing unit. The memory stores one or more pieces of print data, the one or more pieces of print data each representing print content that is at least one of text and an image to be printed on a recording material and being subjected to a print process. The print processing unit performs the print process for a piece of print data among the one or more pieces of print data stored in the memory, and generates a piece of post-process data that represents print content corresponding to the print content represented by the piece of print data. The erase processing unit moves, to a trash or a deletion folder, a piece of data for which the print process has been performed among one or more pieces of data stored in the print processing unit, and performs an erase process for a storage area of the piece of data that has been moved, the erase process being a process of data overwriting and being performed in parallel with the print process that is performed for another piece of print data.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the drawings.

Figure 1:
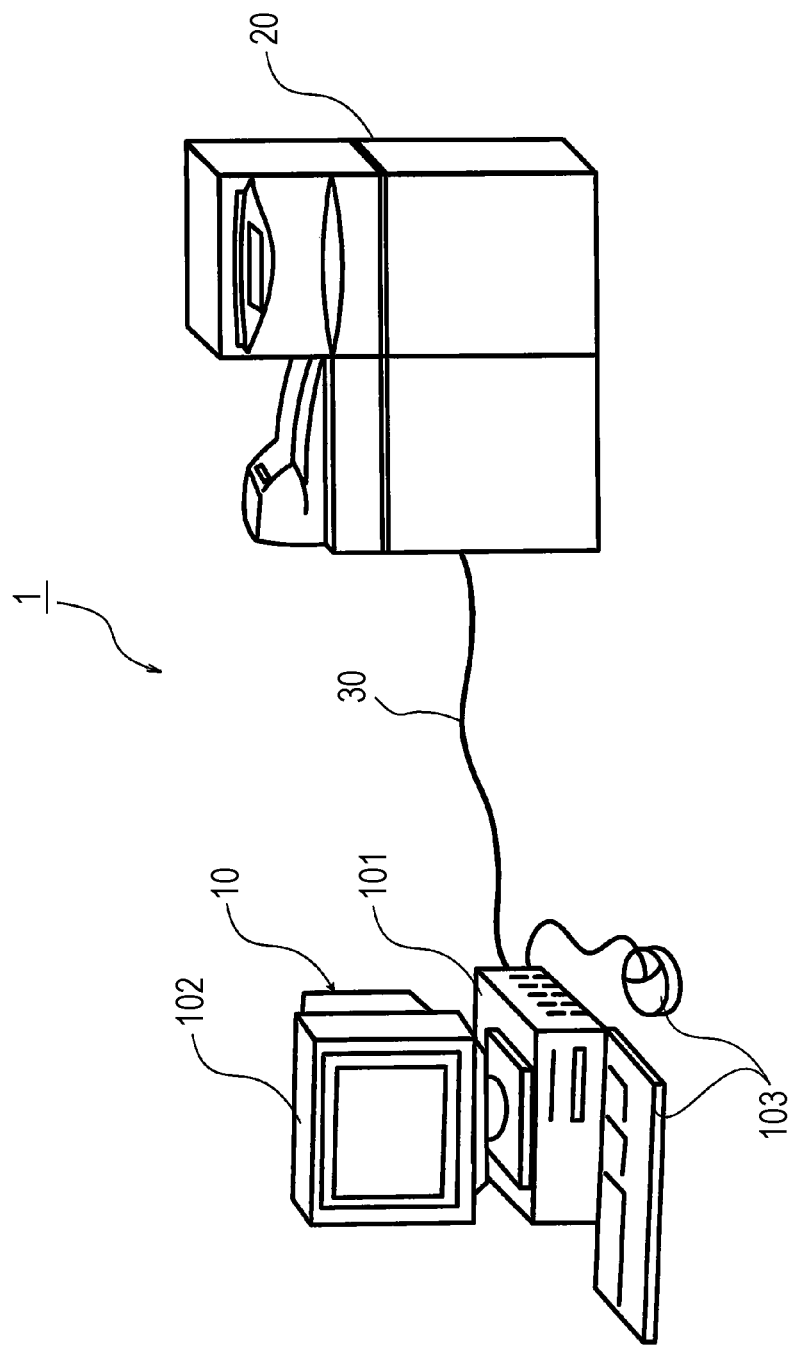
FIG. 1 is a diagram illustrating a print system according to an exemplary embodiment of the present invention.

FIG. 1 is a diagram illustrating a print system 1 according to an exemplary embodiment of the present invention.

The print system 1 includes a print server 10 and a printer 20, and the print server 10 and the printer 20 are connected to each other via, for example, a dedicated cable 30.

The print server 10 includes a system unit 101, a display 102, and an input unit 103. The system unit 101 includes hardware units, namely, a microprocessor, such as a central processing unit (CPU), a random access memory (RAM), and a storage device, such as a read-only memory (ROM) or a hard disk drive (HDD). The storage device stores a program, and the program is read and executed by the microprocessor, such as the CPU. The display 102 includes, for example, a liquid crystal display and displays, for example, an operation screen to a user in accordance with control by the system unit 101. The input unit 103 includes, for example, a keyboard and a mouse and is operated by the user to input various types of information and instructions to the system unit 101.

To the print server 10, page data that represents an image of an output material output by the printer 20 is transmitted via, for example, a local area network (LAN) not illustrated. The page data is data in PostScript (registered trademark) format from Adobe Systems (hereinafter, this format is referred to as "PS format") or in PDF format and represents an image as, for example, a set of objects. The page data as described above corresponds to an example of print data according to an exemplary embodiment of the present invention.

The printer 20 is a large printer that is capable of performing, for example, on-demand printing. The printer 20 forms an image on a sheet in accordance with drawing data (for example, raster data or run-length compressed data) that represents drawing content for drawing the image on a sheet, and outputs the image as a printed material. The drawing data is data that represents the image as a set of pixels, and is constituted by pixel data for each pixel that represents the color of the pixel. The drawing data as described above corresponds to an example of post-process data according to an exemplary embodiment of the present invention.

It is assumed that the print server 10 illustrated in FIG. 1 generates raster data, which is one type of drawing data, from page data in PS format or PDF format and transmits the raster data to the printer 20. The print server 10 corresponds to a print control apparatus according to an exemplary embodiment of the present invention, and the printer 20 corresponds to an example of a print apparatus according to an exemplary embodiment of the present invention.

In this exemplary embodiment, it is assumed that, when a print control program according to an exemplary embodiment of the present invention is installed in a hardware unit of the print server 10, which is an example of an information processing apparatus, and executed, the print server 10 functions as the print control apparatus according to an exemplary embodiment of the present invention.

Figure 2:
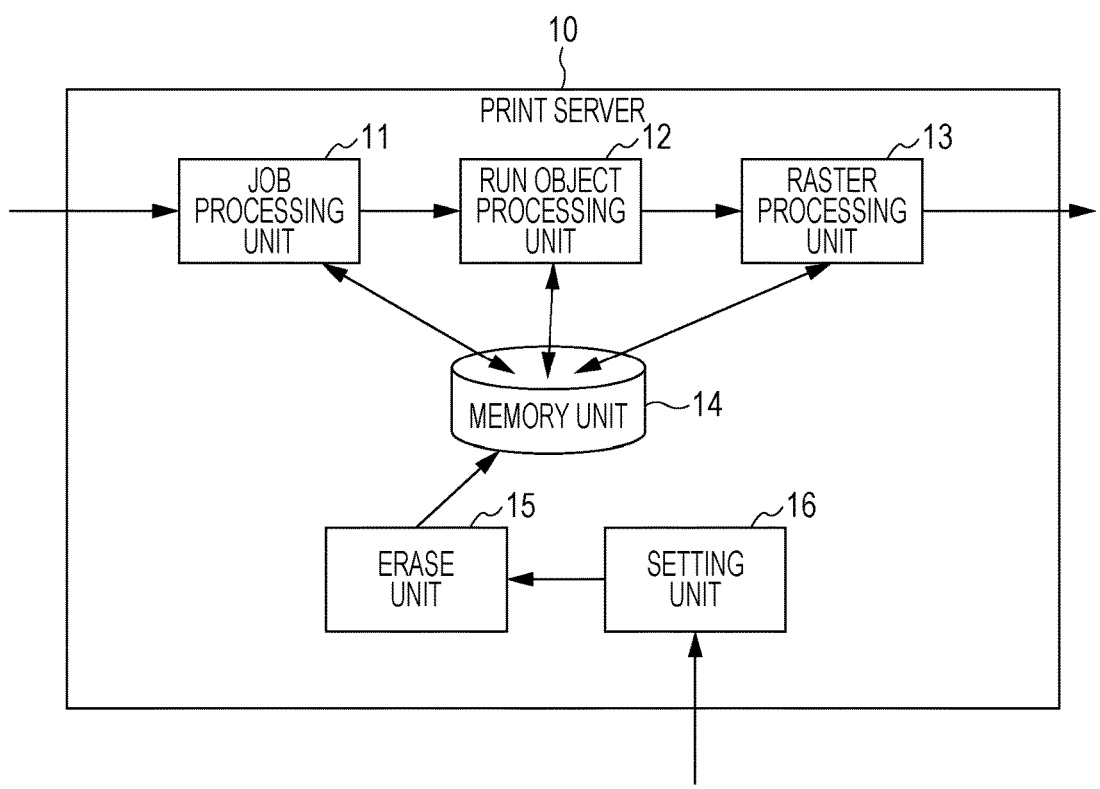
FIG. 2 is a functional block diagram illustrating a functional configuration of a print server.

FIG. 2 is a functional block diagram illustrating a functional configuration of the print server 10. FIG. 2 illustrates a functional configuration of the print server 10, which is the print control apparatus according to an exemplary embodiment of the present invention, and also illustrates a program configuration of the print control program according to an exemplary embodiment of the present invention.

The print server 10 includes, as its functions, a job processing unit 11, a run object processing unit 12, a raster processing unit 13, a memory unit 14, an erase unit 15, and a setting unit 16.

The job processing unit 11 obtains page data described above via, for example, a LAN and stores the page data in the memory unit 14. The memory unit 14 corresponds to an example of a memory according to an exemplary embodiment of the present invention and is implemented as the HDD described above.

The job processing unit 11, the run object processing unit 12, and the raster processing unit 13 perform various processing for data stored in the memory unit 14. The job processing unit 11, the run object processing unit 12, and the raster processing unit 13 correspond to an example of a print processing unit according to an exemplary embodiment of the present invention. The job processing unit 11, the run object processing unit 12, and the raster processing unit 13 generate intermediate data between page data and drawing data as needed and stores the intermediate data in the memory unit 14.

The erase unit 15 erases, among pieces of data stored in the memory unit 14, a piece of data for which processing by the job processing unit 11, the run object processing unit 12, and the raster processing unit 13 is completed. The erase unit 15 erases data such that the erase unit 15 does not simply free up an area in which the data is stored but physically destroys the data by overwriting the data with, for example, a dummy value so as to make recovery of the data difficult. The erase unit 15 corresponds to an example of an erase processing unit according to an exemplary embodiment of the present invention. The above-described erase process by the erase unit 15 may be hereinafter referred to as a complete erase process.

The setting unit 16 performs various types of setting related to the erase process by the erase unit 15. The setting unit 16 corresponds to a unit that combines an example of a target setting unit according to an exemplary embodiment of the present invention, an example of a thoroughness level setting unit according to an exemplary embodiment of the present invention, and an example of a timing setting unit according to an exemplary embodiment of the present invention.

Now, processes and operations in the print server 10 having the above-described functional configuration are described.

Figure 3:
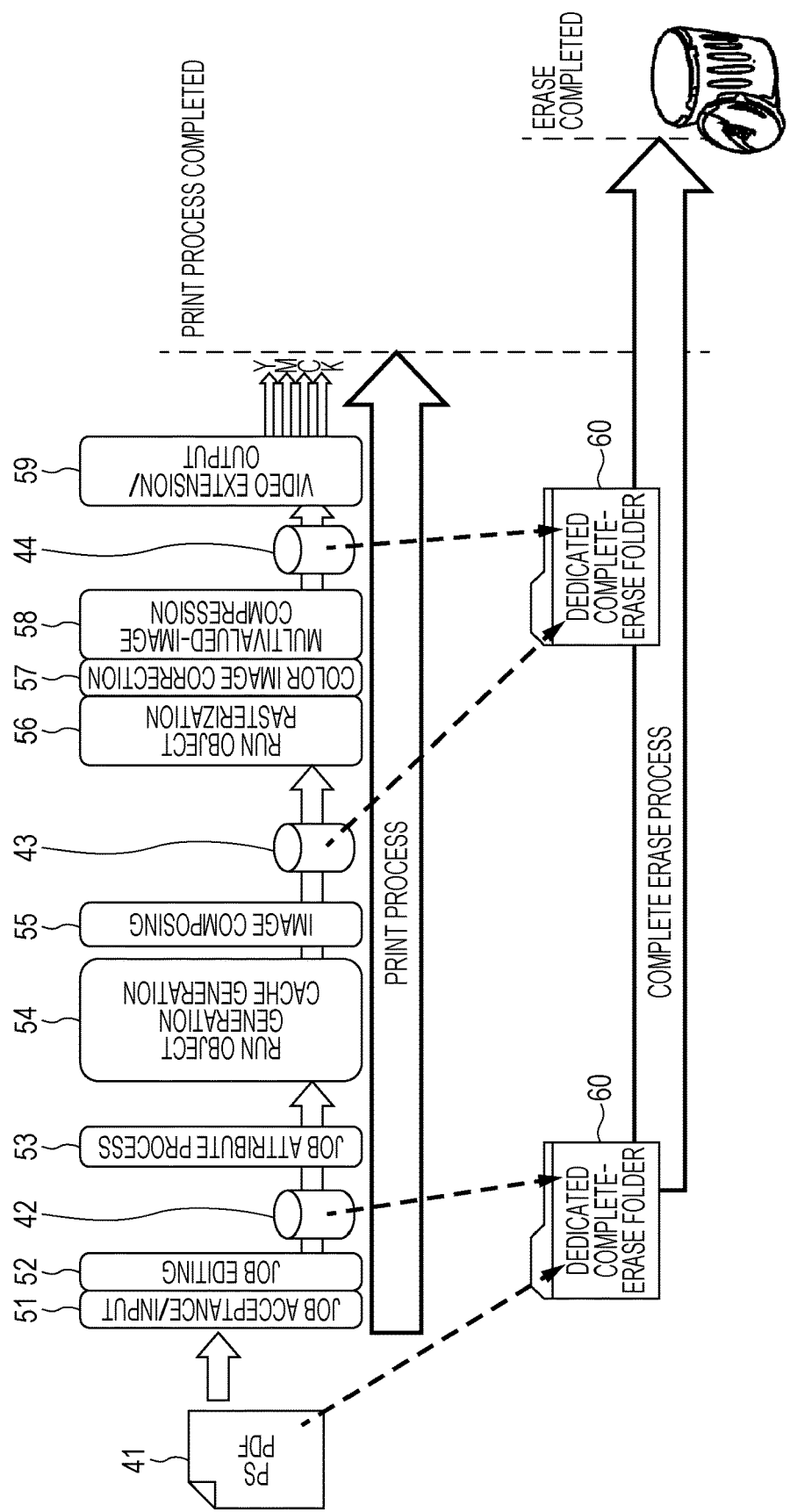
FIG. 3 is a diagram illustrating processes and operations in a print server.

FIG. 3 is a diagram illustrating processes and operations in the print server 10. The processes and operations illustrated in FIG. 3 are described with reference to FIG. 2 as well as FIG. 3.

In the print server 10, the job processing unit 11 obtains page data 41 in PS format or PDF format, performs job acceptance 51, and stores the page data 41 in the memory unit 14. The job processing unit 11 also performs job editing 52 for the accepted job (page data 41), generates first intermediate data 42 obtained after the job editing 52, and stores the first intermediate data 42 in the memory unit 14. Further, the job processing unit 11 performs a job attribute process 53 for the first intermediate data 42. As described above, the job processing unit 11 performs the job acceptance 51, the job editing 52, and the job attribute process 53 as examples of a print process according to an exemplary embodiment of the present invention. Further, the job processing unit 11 moves pre-process data that has been used in the above-described print processes and for which post-process data has been generated (for example, the page data 41 for which the first intermediate data 42 has been generated and the first intermediate data 42 for which the job attribute process 53 has been performed) to a dedicated complete-erase folder 60 as a target of a complete erase process.

The print process according to an exemplary embodiment of the present invention is not limited to a process for changing the print content and may be a process for changing the data format without changing the content. For example, a compression/decompression process and a data conversion process for communication are also included in the print process according to an exemplary embodiment of the present invention as long as these processes are processes for printing.

The run object processing unit 12 performs, as a print process, a generation process 54 for generating an object or a cache for data for which the job attribute process 53 has been performed. The run object processing unit 12 performs, as an example of the print process according to an exemplary embodiment of the present invention, an image composing process 55 for data for which the generation process 54 has been performed to generate second intermediate data 43. The run object processing unit 12 stores the second intermediate data 43 in the memory unit 14.

The raster processing unit 13 performs, as an example of the print process according to an exemplary embodiment of the present invention, a rasterization process 56 for the second intermediate data 43 and further performs, as examples of the print process according to an exemplary embodiment of the present invention, a color image correction process 57 and a multivalued-image compression process 58. The raster processing unit 13 generates third intermediate data 44 as a result of these print processes and stores the third intermediate data 44 in the memory unit 14. Further, the raster processing unit 13 performs, as an example of the print process according to an exemplary embodiment of the present invention, a video extension/output process 59 for the third intermediate data 44 to generate drawing data of yellow (Y), magenta (M), cyan (C), and black (K) and outputs the drawing data to the printer 20 illustrated in FIG. 1.

The second intermediate data 43 after the rasterization process 56 and the third intermediate data 44 after the video extension/output process 59 are also moved to the dedicated complete-erase folder 60 as targets of a complete erase process.

The erase unit 15 performs a complete erase process for overwriting, with, for example, a dummy value, the page data 41, the first intermediate data 42, the second intermediate data 43, and the third intermediate data 44 that have been moved to the dedicated complete-erase folder 60 among pieces of data stored in the memory unit 14. The erase unit 15 performs the complete erase process in parallel with the print processes performed by the job processing unit 11, the run object processing unit 12, and the raster processing unit 13. The complete erase process as described above as well as the print processes is a process that uses resources of the print server 10. However, a resource that has a load differs between the complete erase process and the print processes. That is, in the print processes, for example, the CPU, which is an arithmetic element, has a large load. In the complete erase process, for example, the storage device, such as the HDD, has a large load. Therefore, if the complete erase process and the print processes are performed in parallel, the entire execution time becomes shorter than that in a case of sequentially performing the processes, resulting in increased productivity.

Although productivity is increased, the complete erase process still puts a load on the system. If there is no request for security, a usual erase process that involves a light load may be performed to free up a storage area. Therefore, in this exemplary embodiment, a mode (an erase mode) in an erase process is set in accordance with selection by the user.

Figure 4:
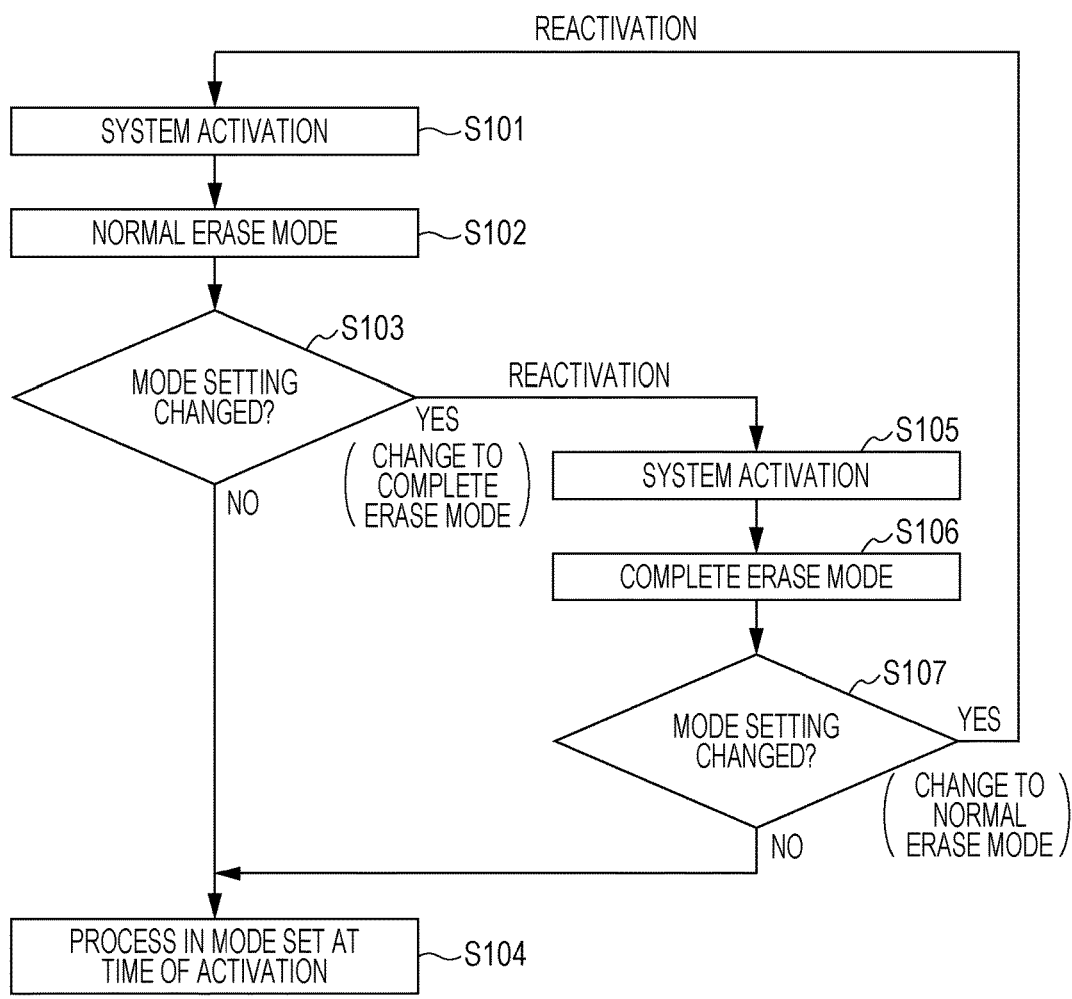
FIG. 4 is a flowchart illustrating a mode setting procedure for setting an erase mode.

FIG. 4 is a flowchart illustrating a mode setting procedure for setting an erase mode.

The mode setting procedure illustrated in FIG. 4 is performed when the print server 10 illustrated in FIG. 1 is activated. When the system of the print server 10 is activated (step S101 or step S105), a mode set at the time of the previous activation is set (step S102 or step S106), and a change screen (not illustrated) for changing the mode setting is displayed to the user (step S103 or step S107). If the user gives an instruction for changing the mode on the change screen (Yes in step S103 or Yes in step S107), the system of the print server 10 is reactivated, and the procedure from step S101 or step S105 described above is repeated.

If the user gives an instruction for keeping the mode unchanged on the change screen described above (No in step S103 or No in step S107), an erase process is performed in an erase mode that is set at the time of activation in step S102 or step S106 (step S104).

Now, various settings for the complete erase process are described.

Figure 5:
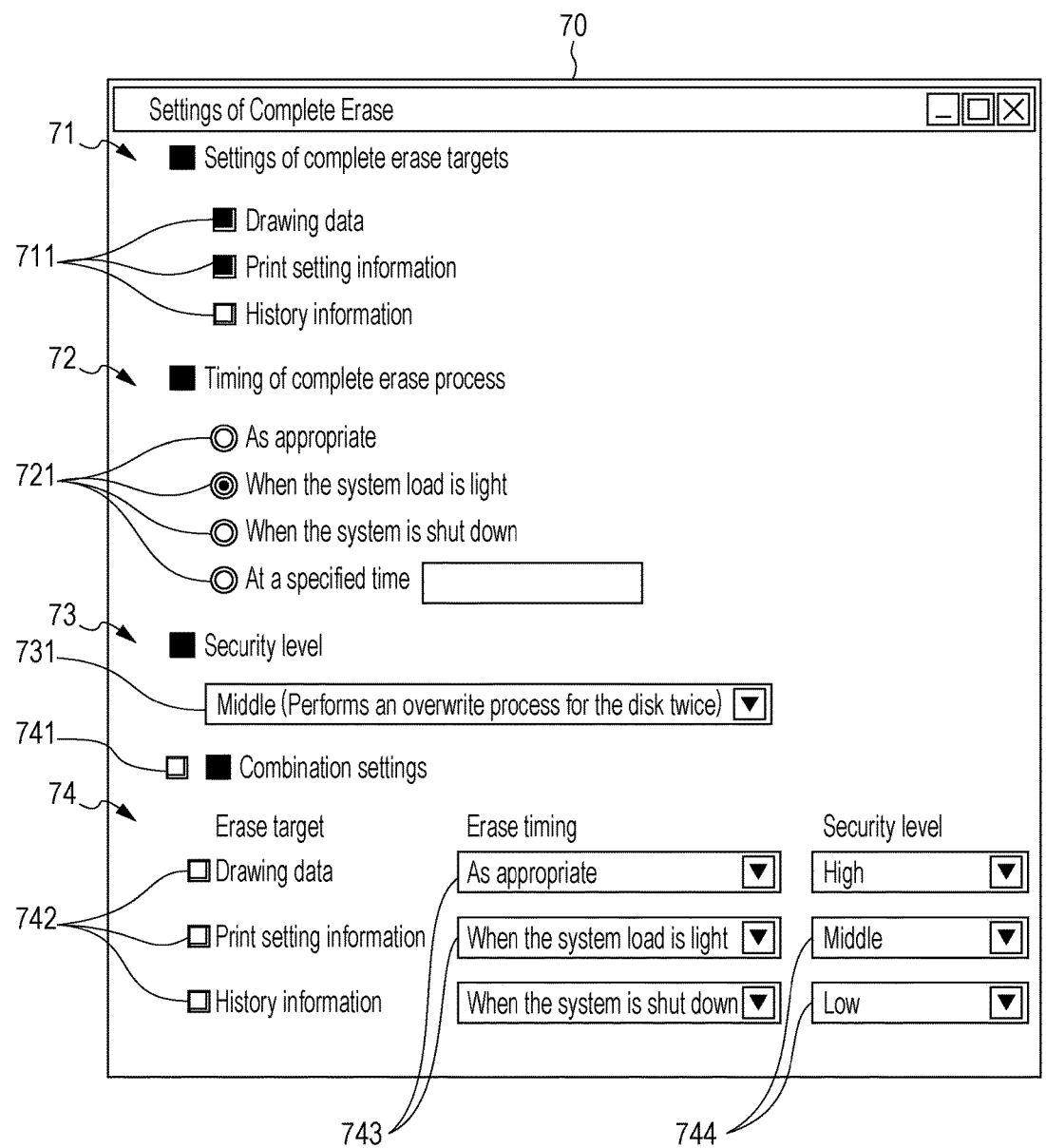
FIG. 5 is a diagram illustrating a setting screen for a complete erase process.

FIG. 5 is a diagram illustrating a setting screen 70 for a complete erase process.

The setting unit 16 illustrated in FIG. 2 displays the setting screen 70 for a complete erase process on the display 102 illustrated in FIG. 1 and receives a setting operation performed by the user via the display 102 and the input unit 103.

The setting screen 70 for a complete erase process includes a target setting section 71, a timing setting section 72, a level setting section 73, and a combination setting section 74.

In the target setting section 71, a piece of data that is a target of a complete erase process is set among the pieces of data stored in the memory unit 14 illustrated in FIG. 2. In FIG. 5, as example targets that may be set, "drawing data", "print setting information", and "history information" are illustrated.

Figure 6:
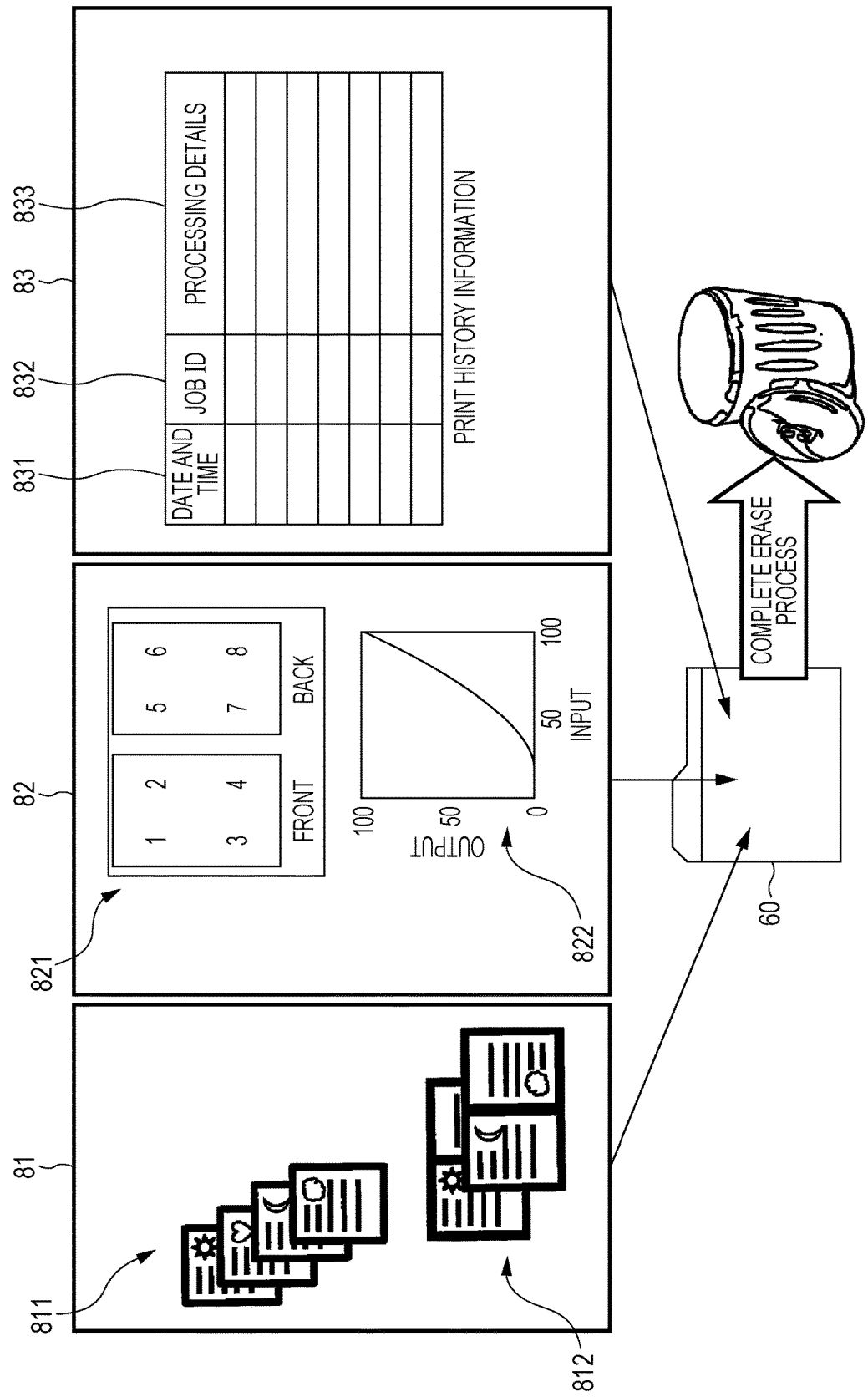
FIG. 6 is a diagram illustrating targets of a complete erase process.

FIG. 6 is a diagram illustrating targets of a complete erase process.

Drawing data 81, which is set as a target of a complete erase process, is data that represents text and images drawn on a printed material. Specifically, examples of the drawing data 81 include an input file 811, which includes page data described above, and output raster data 812, which corresponds to drawing data described above.

Print setting information 82, which is set as a target of a complete erase process, is information that is combined with drawing data to complement print content. Specifically, examples of the print setting information 82 include an imposition setting 821 and a color profile 822. The print setting information 82 described above constitutes part of the print data according to an exemplary embodiment of the present invention and may include, for example, know-how. Therefore, the print setting information 82 alone may be set as a complete erase target.

History information 83, which is set as a target of a complete erase process, is information that represents a history of performed print processes. Specifically, examples of the history information 83 include information in which a date and time 831, a job ID 832, and processing details 833 are associated with one another. However, the history information 83 is not limited to this example and may have various types of formats in which a date and time is associated with information about a print process. The history information 83 is not the print data according to an exemplary embodiment of the present invention but may include part of the print data, such as an ID and a name.

In the target setting section 71 illustrated in FIG. 5, check boxes 711 for selecting one or more targets that the user wants to select as targets of a complete erase process from among the targets illustrated in FIG. 6 are provided.

Among the targets illustrated in FIG. 6, a target that is selected by an operation of a corresponding one of the check boxes 711 is moved to the dedicated complete-erase folder 60 at the time when a print process for the target is completed, and deleted in a complete erase process.

The above-described setting in the target setting section 71 corresponds to an example of setting by the target setting unit according to an exemplary embodiment of the present invention.

In the timing setting section 72 illustrated in FIG. 5, radio buttons 721 for selecting one timing that the user wants to set as the timing at which a complete erase process is performed are provided. If "as appropriate" is selected as the timing for performing, a complete erase process is performed in parallel with a print process each time target data is moved to the dedicated complete-erase folder 60, as illustrated in FIG. 3. As described above, such parallel processing increases print productivity; however, it may be desirable not to perform parallel processing for productivity depending on the details of the print process. In such a case, the user operates one of the radio buttons 721 to select a timing for performing other than "as appropriate".

The above-described setting in the timing setting section 72 corresponds to an example of setting by the timing setting unit according to an exemplary embodiment of the present invention.

Figure 7:
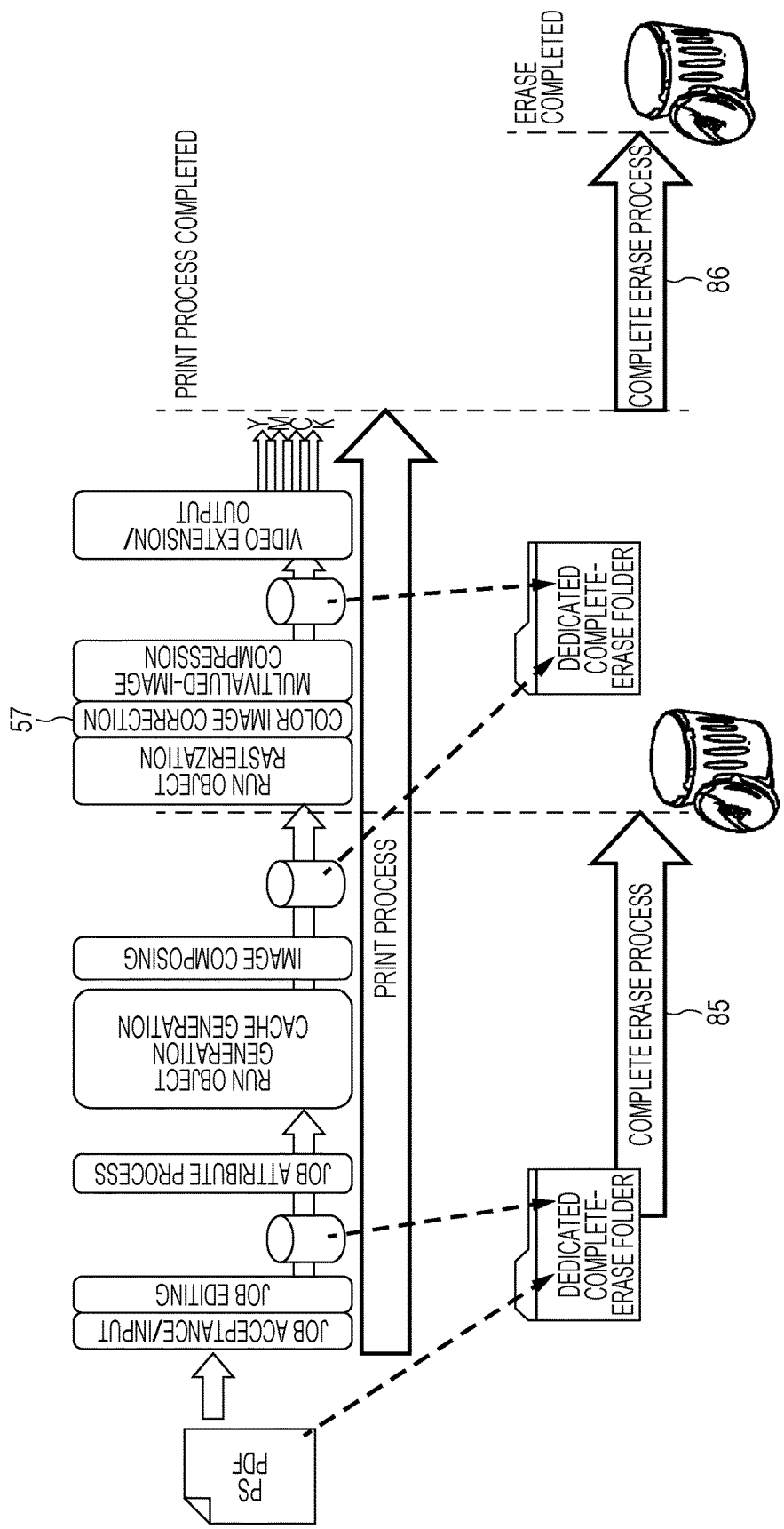
FIG. 7 is a diagram illustrating a complete erase process performed at a timing other than an "as appropriate" timing.

FIG. 7 is a diagram illustrating a complete erase process performed at a timing other than the "as appropriate" timing.

The example illustrated in FIG. 7 assumes that data of print content that involves a large load on the system due to, for example, the color image correction process 57 is used. Even when the same print process is performed, there might not be a large load if the print content differs. In a case of print content that involves a large load, the storage device has a large load because data that represents the print content has a large volume. Therefore, parallel performing of the complete erase process might not be efficient.

In such an example case, "when the system load is light" or "when the system is shut down" is selected by the user as the timing for performing. Then, a complete erase process 85, which is performed in parallel with a print process that puts a light load on the system, or a complete erase process 86, which is performed after a print process is completed, is performed. In a case where "at a specified time" is selected as the timing at which a complete erase process is performed, the complete erase process is performed at the specified time regardless of the timing at which a print process is performed.

In the level setting section 73 illustrated in FIG. 5, a menu box 731 for selecting a security level in a complete erase process is provided. As the number of times erase-target data is repeatedly overwritten with, for example, a dummy value increases, the data is destroyed more thoroughly and data recovery becomes more difficult, resulting in an increased security level.

Figure 8:
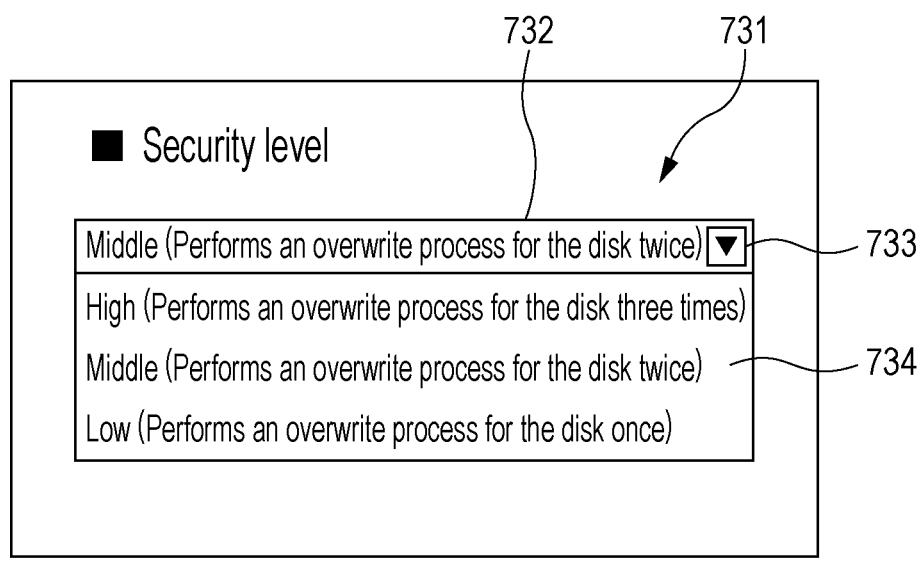
FIG. 8 is a diagram illustrating level selection using a menu box in a level setting section.

FIG. 8 is a diagram illustrating level selection using the menu box 731 in the level setting section 73.

In the menu box 731 of the level setting section 73, a setting display field 732 in which a level that is currently set is displayed and a menu button 733 for displaying a level menu are provided. When the menu button 733 is operated, a drop-down menu 734 is displayed.

In the example illustrated in FIG. 8, three levels of "high", "middle", and "low" are available in the drop-down menu 734. At the "high" level, an overwrite process for a disk area in which data is stored is performed three times. At the "middle" level, the overwrite process is performed twice. At the "low" level, the overwrite process is performed once. A level selected by the user from such a menu is employed in an actual complete erase process.

The above-described setting in the level setting section 73 corresponds to an example of setting by the thoroughness level setting unit according to an exemplary embodiment of the present invention.

In the combination setting section 74 illustrated in FIG. 5, combinations of settings in the target setting section 71, the timing setting section 72, and the level setting section 73 described above are set. In the combination setting section 74, an enabling check box 741 for enabling such combination settings is provided. When the user operates the enabling check box 741, setting in the combination setting section 74 is enabled.

In the combination setting section 74, check boxes 742 for the user to select one or more targets of a complete erase process are provided. When the user operates one of the check boxes 742, a target of a complete erase process is set as in the case of setting in the target setting section 71.

In the combination setting section 74, menu boxes 743 for the user to select a timing at which a complete erase process is performed are provided. When the user operates each of the menu boxes 743, a timing for performing is set for a corresponding one of the targets of an erase process.

In the combination setting section 74, menu boxes 744 for the user to select a security level of a complete erase process are further provided. When the user operates each of the menu boxes 744, a security level is set for a corresponding one of the targets of an erase process.

When a combination of a timing for performing and a security level is set for each target of an erase process, as described above, an erase process desirable for the target is performed, and an erase process that is efficient as a whole is implemented.

Last, a remedy process that is performed in a case where the print server 10 stops due to, for example, a power failure while performing a complete erase process is described.

Figure 9:
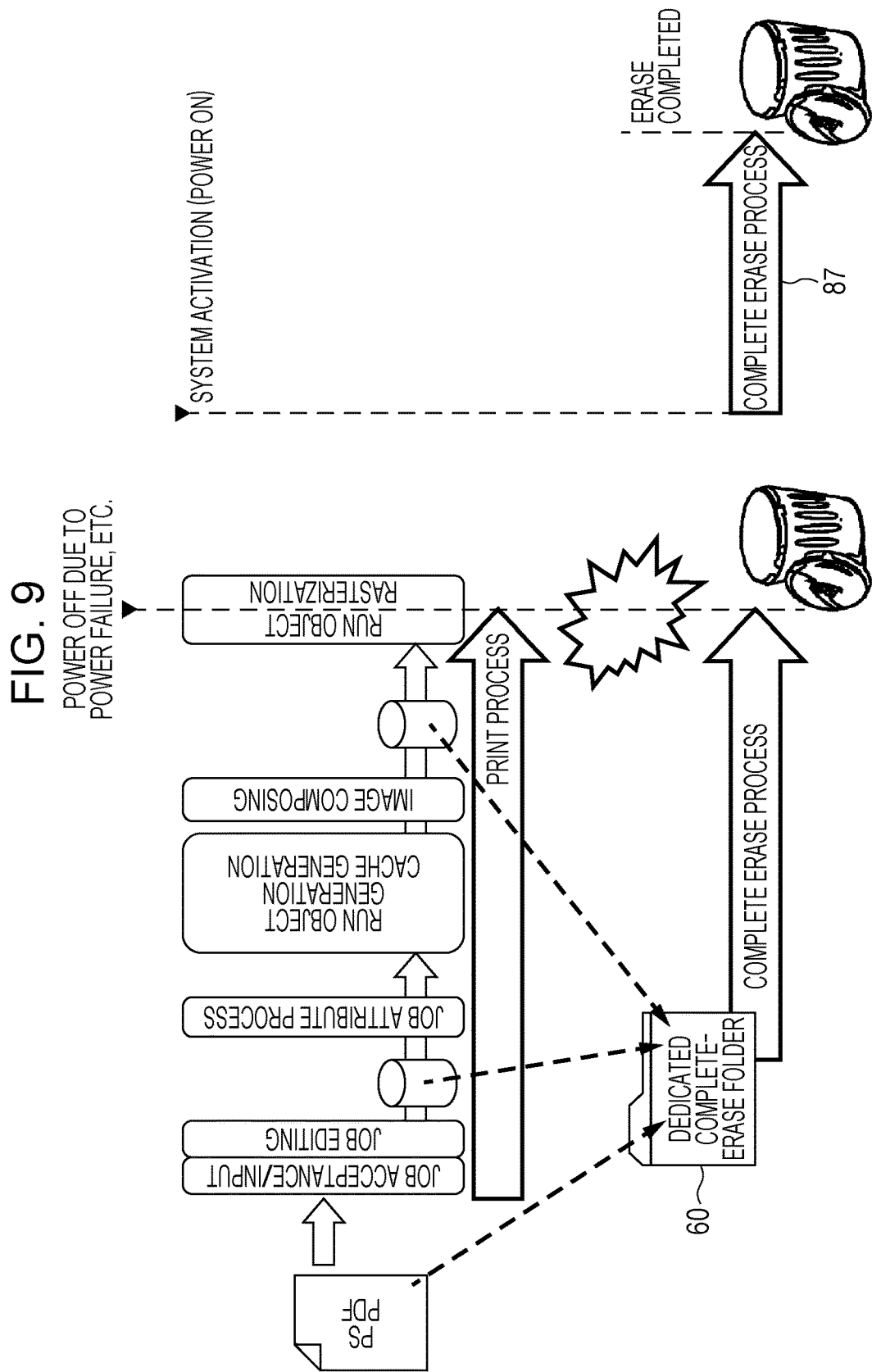
FIG. 9 is a diagram illustrating a remedy process upon, for example, a power failure.

FIG. 9 is a diagram illustrating a remedy process upon, for example, a power failure.

In a case where the print server 10 stops due to, for example, a power failure, some of the pieces of data that have been moved to the dedicated complete-erase folder 60 might not be erased and may remain in the dedicated complete-erase folder 60. Such remaining data leads to a security issue if the data is left. Therefore, in this exemplary embodiment, the erase unit 15 illustrated in FIG. 2 checks the dedicated complete-erase folder 60 when the system of the print server 10 is activated and, if data remains in the dedicated complete-erase folder 60, performs a complete erase process 87 for the remaining data. Accordingly, security is ensured.

In the above description, the print server is described as the print control apparatus according to an exemplary embodiment of the present invention; however, the print control apparatus according to an exemplary embodiment of the present invention may be applied to a controller that is built in and constitutes part of a printer.

In the above description, as an example of the erase processing unit according to an exemplary embodiment of the present invention, the erase unit that erases data moved to the dedicated complete-erase folder 60 is described; however, movement to the folder is only one process for identifying data that is an erase target. The erase processing unit according to an exemplary embodiment of the present invention may be a unit that erases print data identified in another process.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
    a memory that stores one or more pieces of print data, the one or more pieces of print data each representing print content that is at least one of text and an image to be printed on a recording material and being subjected to a print process;
    a print processing unit that performs the print process for a piece of print data among the one or more pieces of print data stored in the memory, and generates a piece of post-process data that represents print content corresponding to the print content represented by the piece of print data; and
    an erase processing unit that moves, to a trash or a deletion folder, a piece of data for which the print process has been performed among one or more pieces of data stored in the print processing unit, and performs an erase process for a storage area of the piece of data that has been moved, the erase process being a process of data overwriting and being performed in parallel with the print process that is performed for another piece of print data,
    wherein the erase processing unit is configured to determine whether to perform the process in response to a user selection including timing of complete erase targets, and the timing is chosen from options including an as appropriate option which performs a complete erase process in parallel with a print process each time a piece of the print data has been moved.

2. The print control apparatus according to claim 1, further comprising a target setting unit that sets at least one of a type and part of the one or more pieces of print data, the type and the part being targets of the erase process.

3. The print control apparatus according to claim 2, further comprising
a thoroughness level setting unit that sets a thoroughness level of the erase process.

4. The print control apparatus according to claim 3, further comprising
a timing setting unit that sets a timing at which the erase process is performed.

5. The print control apparatus according to claim 4, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

6. The print control apparatus according to claim 3, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

7. The print control apparatus according to claim 2, further comprising
a timing setting unit that sets a timing at which the erase process is performed.

8. The print control apparatus according to claim 7, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

9. The print control apparatus according to claim 2, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

10. The print control apparatus according to claim 1, further comprising
a thoroughness level setting unit that sets a thoroughness level of the erase process.

11. The print control apparatus according to claim 10, further comprising
a timing setting unit that sets a timing at which the erase process is performed.

12. The print control apparatus according to claim 11, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

13. The print control apparatus according to claim 10, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

14. The print control apparatus according to claim 1, further comprising
a timing setting unit that sets a timing at which the erase process is performed.

15. The print control apparatus according to claim 14, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

16. The print control apparatus according to claim 1, wherein
in a case where the print control apparatus stops before completion of the erase process, the erase processing unit restarts and completes the erase process for a storage area of a piece of data that is present in the trash or the deletion folder after reactivation of the print control apparatus, the erase process being a process of data overwriting, and thereafter, the print process for another piece of print data is performed.

17. A non-transitory computer readable medium storing a print control program installed in an information processing apparatus and causing the information processing apparatus to function as a print control apparatus and execute a process, the process comprising:
storing one or more pieces of print data, the one or more pieces of print data each representing print content that is at least one of text and an image to be printed on a recording material and being subjected to a print process for printing;
performing the print process for a piece of print data among the stored one or more pieces of print data, and generating a piece of post-process data that represents print content corresponding to the print content represented by the piece of print data; and
performing an erase process for the piece of print data for which the piece of post-process data has been generated among stored one or more pieces of data, the erase process being a process of data overwriting and being performed in parallel with the print process that is performed for another piece of print data,
wherein the erase process is performed in response to a user selection including timing of complete erase targets, wherein the timing is chosen from options including an as appropriate option which performs a complete erase process in parallel with a print process each time a piece of the print data has been moved.

18. A print system comprising:
- a memory that stores one or more pieces of print data, the one or more pieces of print data each representing print content that is at least one of text and an image to be printed on a recording material and being subjected to a print process for printing;
- a print processing unit that performs the print process for a piece of print data among the one or more pieces of print data stored in the memory, and generates a piece of post-process data that represents print content corresponding to the print content represented by the piece of print data;
- an erase processing unit that performs an erase process for the piece of print data for which the piece of post-process data has been generated among one or more pieces of data stored in the print processing unit, the erase process being a process of data overwriting and being performed in parallel with the print process that is performed for another piece of print data,
- wherein the erase processing unit is configured to determine whether to perform the process in response to a user selection including timing of complete erase targets, wherein the timing is chosen from options including an as appropriate option which performs a complete erase process in parallel with a print process each time a piece of the print data has been moved; and
- a print unit that operates in accordance with the piece of post-process data to print the print content on a recording material.

* * * * *